G. J. MARTEL.
REPAIR PATCH FOR PNEUMATIC TIRES.
APPLICATION FILED JAN. 16, 1911.

1,003,004.

Patented Sept. 12, 1911.

Witnesses:
A. A. Olson
B. G. Richards

Inventor:
Gustave J. Martel
by Joshua R. H. Potts
his Attorney.

UNITED STATES PATENT OFFICE.

GUSTAVE J. MARTEL, OF CHICAGO, ILLINOIS.

REPAIR-PATCH FOR PNEUMATIC TIRES.

1,003,004.	Specification of Letters Patent.	Patented Sept. 12, 1911.

Application filed January 16, 1911. Serial No. 602,876.

*To all whom it may concern:*

Be it known that I, GUSTAVE J. MARTEL, a citizen of the United States, and a resident of the city of Chicago, county of Cook, and State of Illinois, have invented certain new and useful Improvements in Repair-Patches for Pneumatic Tires, of which the following is a specification.

This invention relates to improvements in repair patches for pneumatic tires and has for its object the provision of a device of this character which will be so constructed as to be adapted to be readily and quickly applied for use and as expeditiously detached when desired.

A further object is the production of a repair patch as mentioned which will be of durable and economical construction and efficient in operation.

Other objects will appear hereinafter.

With these objects in view my invention consists in the combination and arrangements of parts hereinafter described and claimed.

My invention will be best understood by reference to the accompanying drawing forming a part of this specification and in which—

Figure 1:
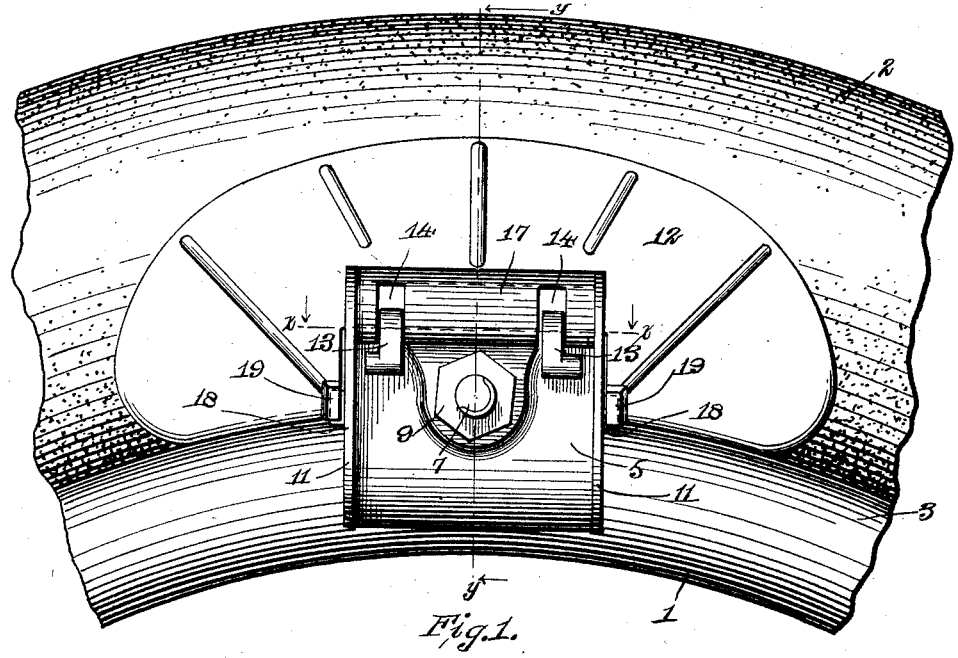
Figure 2:
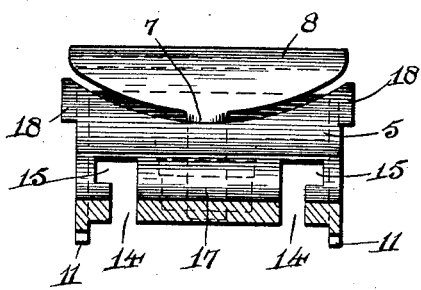
Figure 3:
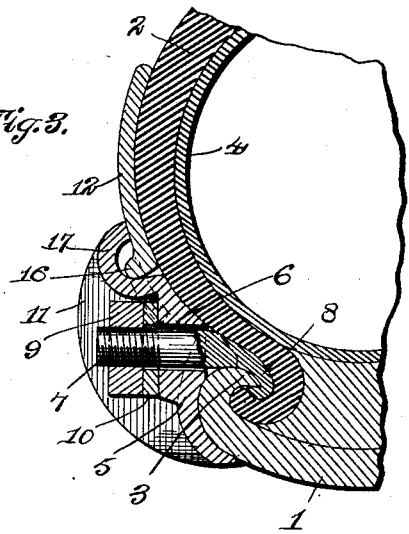

Figure 1 is a fragmentary side elevation of a conventional form of pneumatic tire and rim to which is applied a patching device embodying my invention, and Figs. 2 and 3 are sections taken on substantially lines *x*—*x* and *y*—*y* respectively of Fig. 1.

Referring now to the drawing 1 indicates the rim of an ordinary pneumatic wheel in which is mounted the tire casing 2, the longitudinal edges of the latter being secured in the usual manner in the rim 1 by means of circumferential outwardly projecting gripping flanges 3. Arranged in the casing 2 is the usual air tube 4.

The preferred form of my construction which is applied to the pneumatic wheel construction just described comprises an outer jaw member 5 the lower or inner end portion of which is formed to snugly engage the outer side of one of the flanges 3, the upper end portion of said jaw member being formed to rest snugly against the adjacent side of the casing 2. Formed centrally in the jaw member 5 is a transversely extending opening 6 through which extends loosely the shank 7 of the jaw member 8, the latter being of hooked form as clearly shown in Fig. 3, for engagement of the inner edge of the flange 3. The outer end portion of the shank 7 is threaded for the reception of a nut 9 whereby said jaw members 5 and 8 may evidently be forced into rigid gripping relation with the flange 3, a nut lock 10 being preferably interposed between the outer side of the jaw member 5 and the inner side of the nut 9 in order to prevent retrograde rotation of the latter and consequent loosening of gripping devices upon the rim. Provided at opposite edges of the jaw member 5 are outwardly projecting flanges or ribs 11, the latter being provided in order to provide a light construction which will at the same time possess great strength and durability; said flanges 11 serving also, as will be observed, as guards for the outer extremity of the shank 7 and nut 9 preventing contacting thereof with any projection or obstruction in the road in the path of the wheel which might contact and damage the same were this provision not made.

Mounted in the upper or outer extended end of the jaw member 5 is a patch plate 12, the inner surface thereof being of a conformation identical with that of the adjacent side of the outer casing 2, so that said patch plate is adapted to remain in snug engagement with said outer casing when arranged thereon. The lower edge of said plate is cut away centrally for the reception of the upper end of said jaw member 5, the same being provided with spaced depending fingers 13 which loosely engage slots 14 provided in the upper end portion of said jaw member. The lower end of said fingers are enlarged so that insertion thereof into the slots 14 is only permitted at the lower enlarged ends 15 of said slots. With this arrangement it will be seen that after once inserting said fingers into said slots, the same will be locked therein and hence the plate 12 locked to the jaw member 4, releasing of said fingers and hence detachment of said plate being permitted only when the enlarged lower ends of said fingers are in registration with said enlarged ends 15 of said slots. The lower edge of said plate 12 at the recess therein is provided with an outwardly extending bead 16, the upper end portion 17 of said jaw member being semi-cylindrically formed or channeled for the reception thereof. Said bead is so arranged that, when the plate is in operative position in the jaw member 5 and against the side of the tire, said plate will be supported upon the outer end of said bead. With this provision, it will be seen that the point or edge of support of said plate will be outward of the center of gravity of said plate so that, upon collapse of the tire, the outer end of said plate will be free to swing inwardly, and when in the position shown will do so by its own gravity. With this arrangement, then, upon collapse of the tire as by reason of a blow out, when the vehicle is running, the plate 12 will swing inwardly upon such collapse preventing engagement of the outer edge thereof with the ground as the wheel is rotated and hence avoid jarring of the car such as would result were said car held rigid. Outward swinging of the plate 12 is limited by lugs 18 formed at the opposite edges of the jaw member 4, such lugs being arranged for engagement by the adjacent lower edge of said plate, which is provided with sockets 19 for the reception thereof as clearly shown in Fig. 1.

A device of a construction as set forth is simple and economical in construction, the simplicity thereof reducing the weight of the metal employed therein to a minimum. The device is adapted to be quickly applied to a rim, when the tire is in collapsed condition, the jaw members which constitute the supporting element of the device being so designed as to be adapted to rigidly and positively engage either of the gripping flanges of the rim. The device is of great efficiency in use and is not susceptible to readily becoming inoperative.

While I have illustrated and described the preferred construction for carrying my invention into effect this is capable of variations and modifications without departing from the spirit of the invention. I, therefore, do not wish to be limited to the exact details of construction as set forth but desire to avail myself of such variations and changes as come within the scope of the appended claims.

Having described my invention what I claim as new and desire to secure by Letters Patent is:

1. The combination with a rim and a pneumatic tire mounted thereon, of a patching device for said tire, said device comprising a supporting element consisting of two jaw members embracing and clamped to one edge of said rim; and a plate pivotally connected with said supporting element and held thereby against the adjacent side of said tire, substantially as described.

2. The combination with a rim and a pneumatic tire mounted thereon, of a patching device for said tire, said device comprising a supporting element consisting of an outer jaw member resting against the outer side of one of the gripping flanges provided at the edges of said rim; and an inner hooked jaw member engaging the inner side of said flange, said inner jaw member being provided with a shank passing through and adjustably secured in said outer jaw member; and a plate pivotally connected with said outer jaw member and held thereby against the adjacent side of said tire, substantially as described.

In testimony whereof I have signed my name to this specification in the presence of two subscribing witnesses.

GUSTAVE J. MARTEL.

Witnesses:
HELEN F. LILLIS,
JOSHUA R. H. POTTS.

---

Copies of this patent may be obtained for five cents each, by addressing the "Commissioner of Patents, Washington, D. C."